…

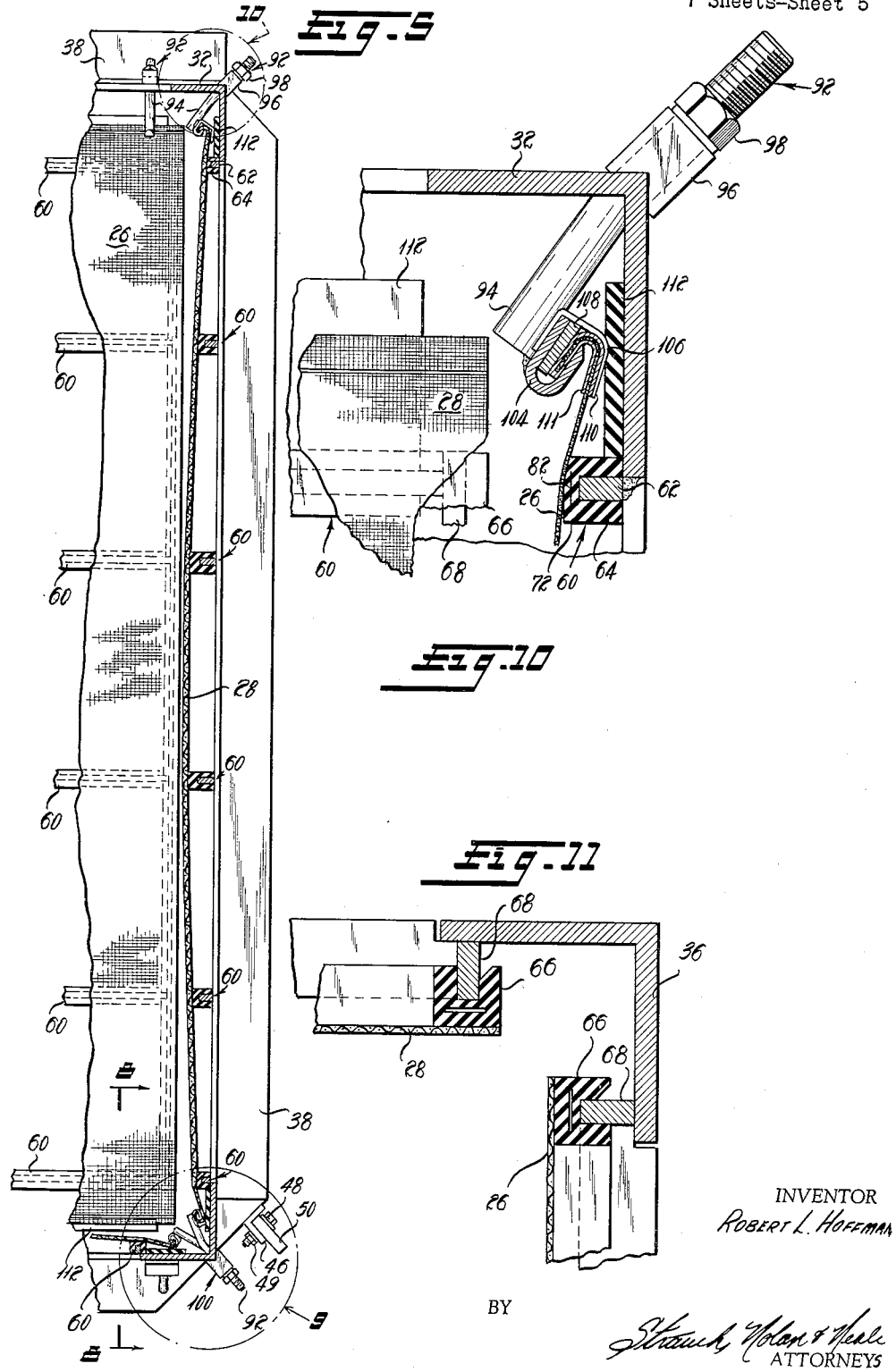

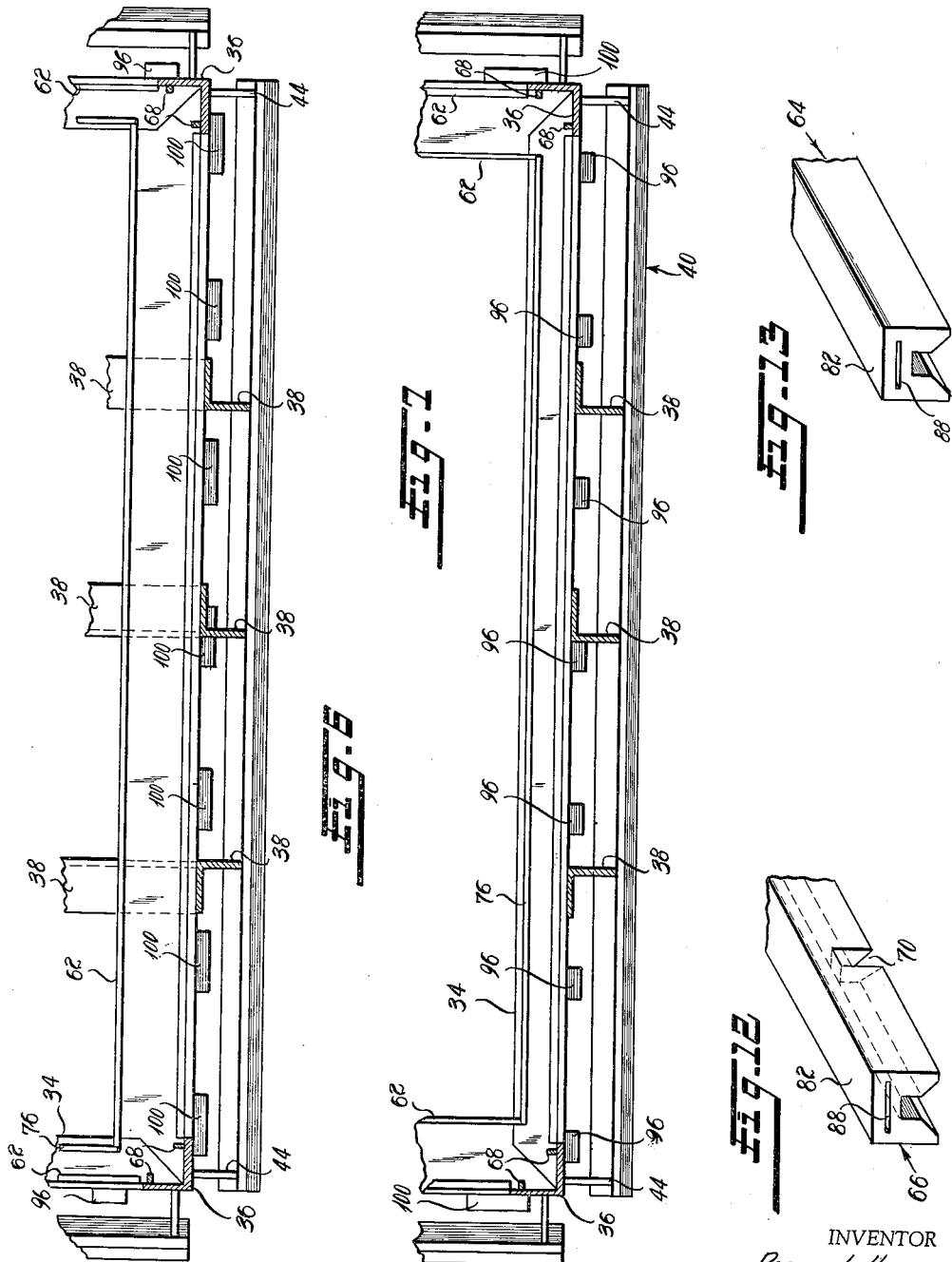

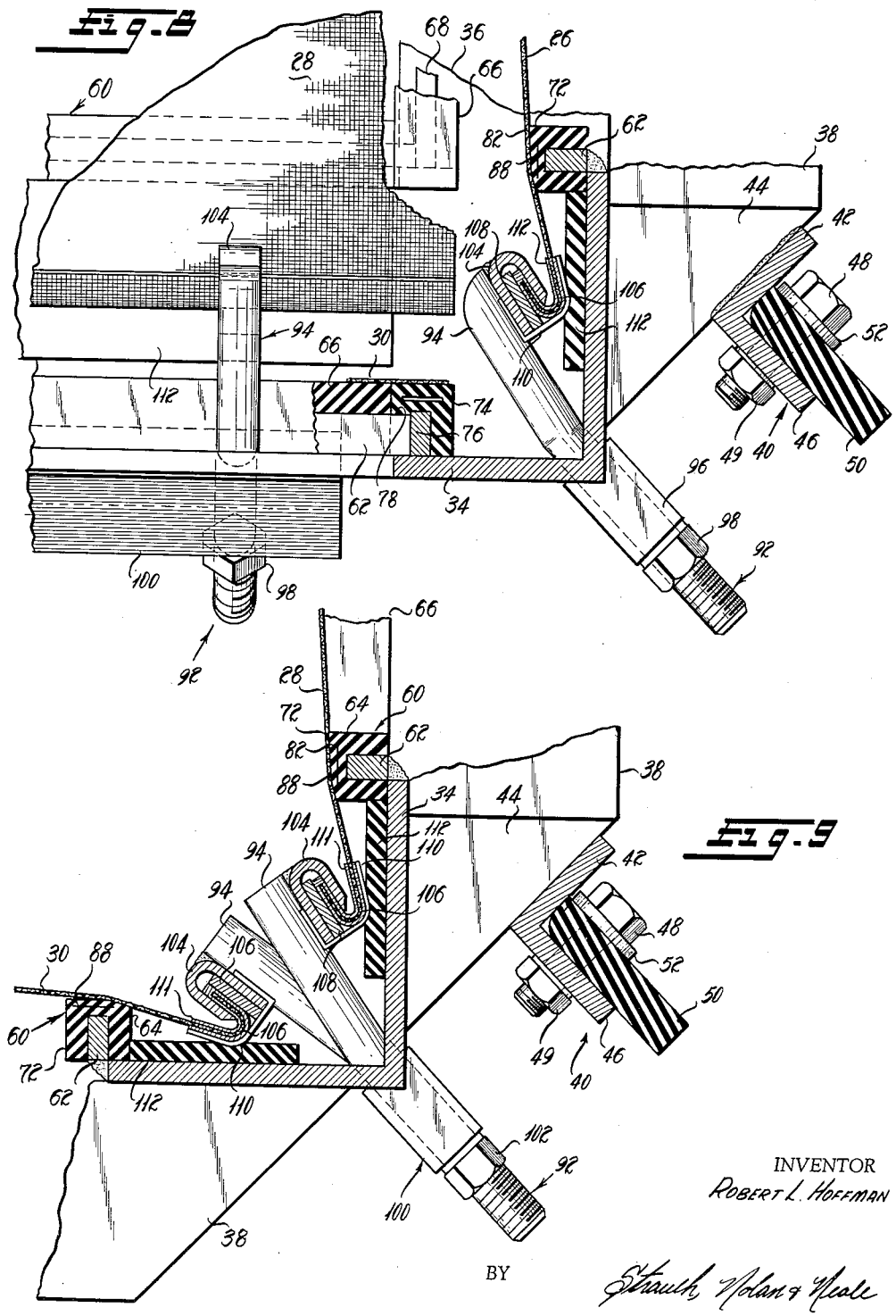

United States Patent Office 2,975,900
Patented Mar. 21, 1961

2,975,900

BASKET SCREENS AND IMPROVED MOUNTING ATTACHMENTS THEREFOR

Robert L. Hoffman, San Francisco, Calif., assignor to Western Machinery Company, San Francisco, Calif., a corporation of Utah Filed Dec. 8, 1958, Ser. No. 778,900

17 Claims. (Cl. 209—403)

This invention relates to improvements in basket screen structures and is more particularly concerned with the mounting of flexible screens in box frames for use in sizing, screening or filtering operations.

One possible application of the present invention is in connection with the recovery of uranium by a method referred to as a resin-in-pulp process. In such a process, uranium ore initially is mixed with a neutral liquid solution and is ground or crushed to a required particle size to form a pulp (pulverized ore mixed with water or other liquid). This pulp is leached with sulfuric acid in suitable tanks that discharge the leached pulp into classifiers where a large proportion of the coarser and heavier particles of loose granular material resulting from disintegration of the core, otherwise referred to as sands, are removed from the pulp solution.

The pulp, now containing only fine solid particles, is exposed to ion exchange resins in the form of moderately coarse particles which are sometimes referred to as beads, in order to remove the complex uranium anion, $U_3O_8$. This is accomplished by feeding the leached pulp into open tanks through resin-in-pulp basket screens carrying the resin beads. These resin-in-pulp baskets are vertically oscillated in the open tanks to flush through the moving pulp whereby the resin beads come in contact with the pulp.

Due to the foregoing ion exchange, the uranium anion product ($U_3O_8$) is deposited on the resin beads. The filtered pulp is drained from the tanks and the resin beads carrying the uranium deposits on the screens are washed down with fresh water. In order to dissolve the uranium from the resin beads, the resin-in-pulp baskets carrying the uranium coated beads are oscillated in tanks filled with nitric acid solution. This solution is thereby precipitated out to obtain a yellow cake uranium ($U_3O_8$).

It will be appreciated that in carrying out such a process, numerous and serious engineering problems arise with respect to the apparatus employed. To this end, particular difficulty has been encountered with the resin-in-pulp basket screens.

These basket screens employed in such a recovery process generally are of box type structure having four screened side walls mutually perpendicular to a screen bottom to achieve a maximum sizing area that can be flushed through the leached pulp or the nitric acid solution. These screened walls are composed of a flexible wire mesh and are supported in a suitable frame flexibly connected to a prime mover to oscillate the screen structure in the open tank to carry out the steps in the above process.

Among the more serious shortcomings of employing such a structure is the relatively short operational life of the screens forming the basket. The failure of the screens is directly attributable to uneven tensions and slacks over the faces thereof which heretofore could not be effectively eliminated. As a result, during operation of the system, the weight of the resin beads and the hydraulic head exerting pressure on the screened walls of the basket tended to force the screened walls outwardly when the baskets were raised out of the liquid filled tank in the course of its oscillating motion. Conversely, when the baskets were lowered into the liquid, the pressure of the liquid tended to force the screen walls inwardly. Consequently, the resulting rapid reverse bending of the screen walls due to the loose mounting thereof was effective to cause wire fatigue of the screen mesh leading to premature failure thereof. These premature screen failures presented serious economic problems in carrying out the process since, whenever the failures occurred, it was necessary to shut down the plant to make the necessary repairs or incur a susbtantial loss of uranium covered beads.

In the past, the particular manner of securing the screens to the frame as by bolts or similar fastening elements substantially precluded the possibility of eliminating the uneven tensions and slacks in the screen in that it was not possible to properly align the bolt holes through the screen with the corresponding bolt holes in the frame. As a consequence of the inability to accurately align the bolt holes, variations in slacks and tensions occurred at each section of screen between adjacent bolts over the face of the entire screen panel.

In an attempt to overcome these shortcomings, it has been proposed that the screens be uniformly stretched around bars or pins carried by the frame at the corners of the screens. The difficulties encountered here were that the required tension in the screens could not be obtained with the maximum tensioning force available since the screens had to be stretched too sharply around the radius of the bars. Moreover, an additional difficulty developed in that the bottom corners of the screens could not be adequately sealed with the enclosing parts of frame between the screens to prevent the loss of uranium carrying resin beads which become loose in the basket.

Other efforts amounted to pulling a straight tension on the screens toward the corners or marginal edges thereof. While this arrangement provided the desired tension to eliminate uneven tensions and slacks, it did not seal or clamp the edges of the screens on all the corners with enclosing parts of the frame. Several attempts were made under this arrangement in an endeavor to seal the screens so that the resin beads would not be passed through the basket structure into the filtered pulp and thereby to minimize the loss of uranium by assuring the confinement of the resin beads to the inside of the basket. A positive seal, however, was found to be unattainable with the straight tensioning ararngement since the screen would be pulled parallel to any gaskets carried by the frame and provided around the marginal edges of the screen so that a fluid-tight seal by compressing the gasket with the screen could not be achieved.

Moreover, several shortcomings were experienced in the selection of appropriate gasket strips to seal the marginal edges of the screen with the enclosed parts of the frame. The gasket failures were primarily due to the corrosive nature of the sulphuric leach liquid and its influence on common types of resilient sealing strips such as sponge rubber. Other rubbers while not being attacked by the leach liquid were not sufficiently soft to intermesh with the screen to form a seal. When the hardness was reduced to provide an intermeshing seal, it was found that the reduction in rigidity did not permit the required tensioning of the screen.

A further problem encountered which accelerated the failures of the screens was with corrosion on the screen at points of metal-to-rubber sealing gasket contact and meal-to-metal contact. The corrosion of the screens is commonly known as "crevice" corrosion and is engendered by a condition wherein certain ions in a mother solution migrate selectively through a scale deposit, so that the solution on one side of the selective media is different from the mother solution. The metal of the screen then dissolves to re-establish equilibrium potential, which dissolution continues until corrosion failure results.

It will be appreciated from the foregoing that none of the prior proposals were adequate to achieve a uniform tensioning of corrosion-free basket screens and at the same time to effectively provide a liquid-tight seal between the frame enclosure and the marginal edges of the screens to prevent loss of resin beads through the basket.

Thus the present invention has as its general aim and purpose a novel mounting and fastening for flexible screens in a basket screen structure wherein the flexible screens are uniformly tensioned to prevent reverse bending and are sealed liquid-tight about the marginal edges thereof with the enclosing parts of the supporting frame. This invention has as its further purpose the provision of a corrosion preventer and inhibitor whereby the basket screen is free of acidic or other corrosion.

Accordingly, with the foregoing purposes and considerations in mind, it is the primary object of this invention to provide for an improved basket structure having tautly mounted flexible wire mesh screen walls sealed liquid-tight around its marginal edges with the enclosing parts of a support frame whereby reverse bending of the screen caused by a variance in the magnitude of pressures and forces applied to the walls of the basket structure is obviated and whereby transfer of fluid and material in the basket is confined to a passage through the wire mesh screen walls. In accordance with the present invention, this is accomplished by providing resilient sealing gaskets facially around the marginal edges of the screens between the screens and the frame support to prevent leakage between the edges of adjacent screens. The screens are mounted and cambered on the frame so as to precompress the resilient sealing gaskets against the frame and an adjustable uniform horizontal pull is applied transversely across the cambered face of each screen whereby the screens are uniformly tensioned and tightly drawn across cambered support surfaces of the frame to establish a uniform tensile force within the screen and a vertical force component which vertically presses the screens into the resilient sealing gaskets thereby compressing the latter facially between the marginal edges of the screens and the frame to establish the liquid-tight seal.

Accordingly, it is a further object of this invention to provide in a screen basket structure having flexible wire mesh screen walls, an improved means for tautly mounting the screen walls over support surfaces which cambers the screens to establish a uniform tensile force across the faces thereof, the vertical component of which presses the marginal edges of the faces of the screens into resilient sealing strips facially disposed between the marginal edges of the screens and the support frame whereby a liquid-tight seal is established therebetween.

A further object of this invention is to provide in an improved basket screen structure having flexible wire mesh screen walls set up in angular adjoining relation to each other, a support frame with cambering bars over which the screen walls are supported in cambered relation, and screen tensioning clamps carried by the frame and fastened to opposed sides of the screens to apply a horizontal pull on each screen across the cambered face thereof to uniformly tightly draw the screens over the cambered support bars and to vertically press the marginal edges thereof into resilient sealing strips facially disposed between the marginal edges of the screens and the frame to assure a liquid-tight seal therebetween.

Still another object of this invention is to provide a novel basket screen structure having flexible wire mesh screen walls supported on a frame and embodying adjustable tensioning stud bolt clamps carried by the frame including eccentrically mounted hook fastener elements to grip and secure the screen in place on the frame and for applying a horizontal pull on the screen from opposed sides thereof wherein the eccentric thrust of the hook is carried as a bending stress on the stud bolt clamps.

Still another object of this invention is to provide for a film-like coating over the screen and the resilient sealing and cambering gasket strips for retarding and minimizing corrosion thereof.

Still another object of this invention is to provide for an improved rectangular basket screen structure having screen walls set up in angular relation to each other which are mounted on a frame support in a manner to facilitate ease of replacement thereof.

Still another object of this invention is to provide for an improved basket screen structure which is simple in construction and comparatively inexpensive to construct.

Further objects will presently appear as the description proceeds in connection with the appended claims and annexed drawings wherein:

Figure 5 is a partial vertical section substantially on the line 5—5 of Figure 3;

Figure 6 is a partial horizontal section substantially on line 6—6 of Figure 1 with the bottom screen and sealing gaskets removed;

Figure 7 is a partial horizontal section substantially on line 7—7 of Figure 2 with the bottom screen and sealing gaskets removed;

Figure 8 is an enlarged partial section taken on the line 8—8 of Figure 5;

Figure 9 is an enlarged fragmentary view of the upper right-hand corner portion of Figure 5 enclosed within the phantomed circle 9;

Figure 10 is an enlarged fragmentary view of the lower right-hand corner portion of Figure 5 enclosed within the phantomed circle 10;

Figure 11 is an enlarged fragmentary view of the portion of Figure 4 enclosed within the phantomed circle 11;

Figure 12 is a fragmentary perspective view of the sealing gasket strip; and

Figure 13 is a fragmentary perspective view of the cambering rail gasket strip.

Figure 1:
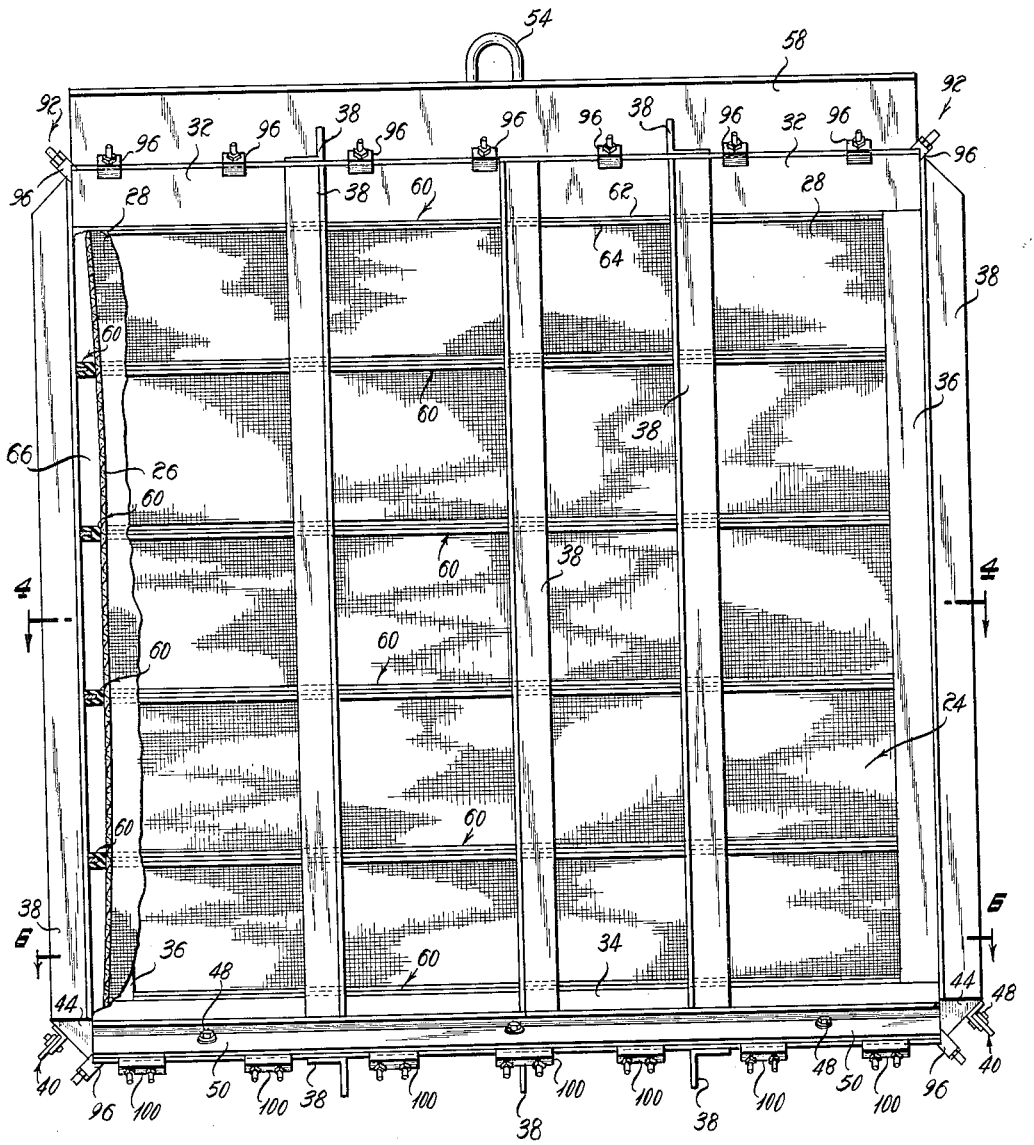
Figure 1 is an end elevation of a basket screen structure embodying the principles of the present invention and having the end screen wall partially removed.
Figure 2:
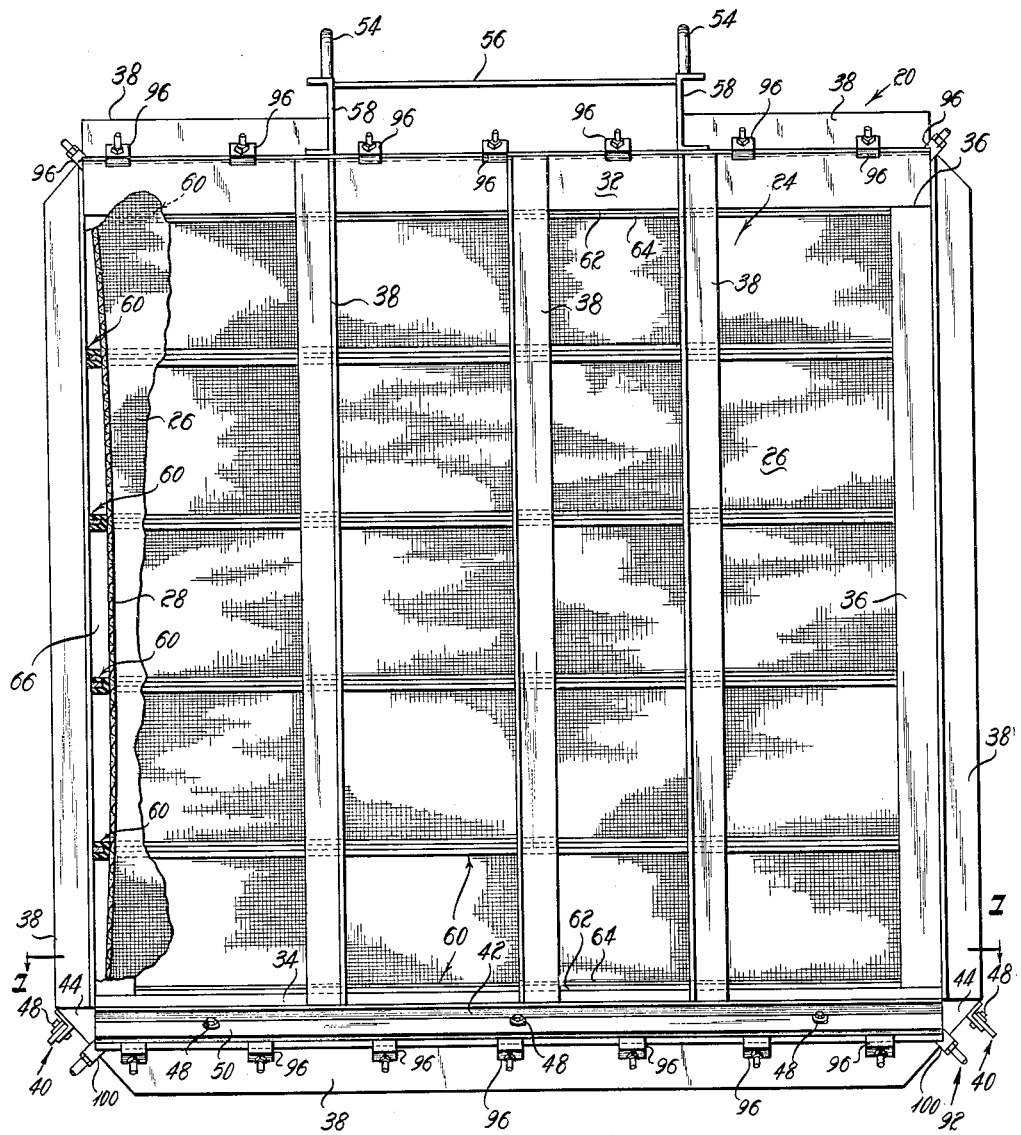
Figure 2 is a side elevation of the basket screen of Figure 1 having the side screen wall partially removed.
Figure 3:
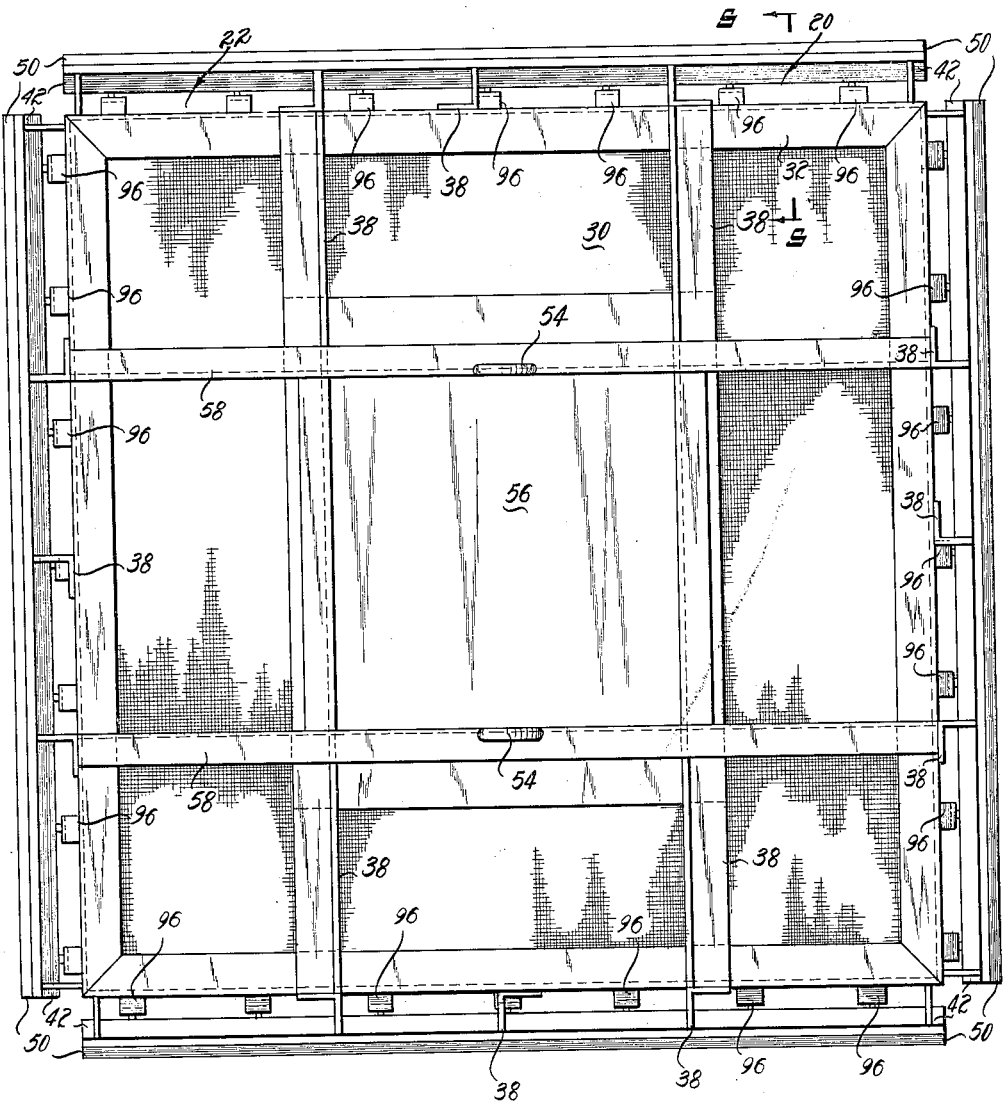
Figure 3 is a top plan view of the basket screen of Figure 1.
Figure 4:
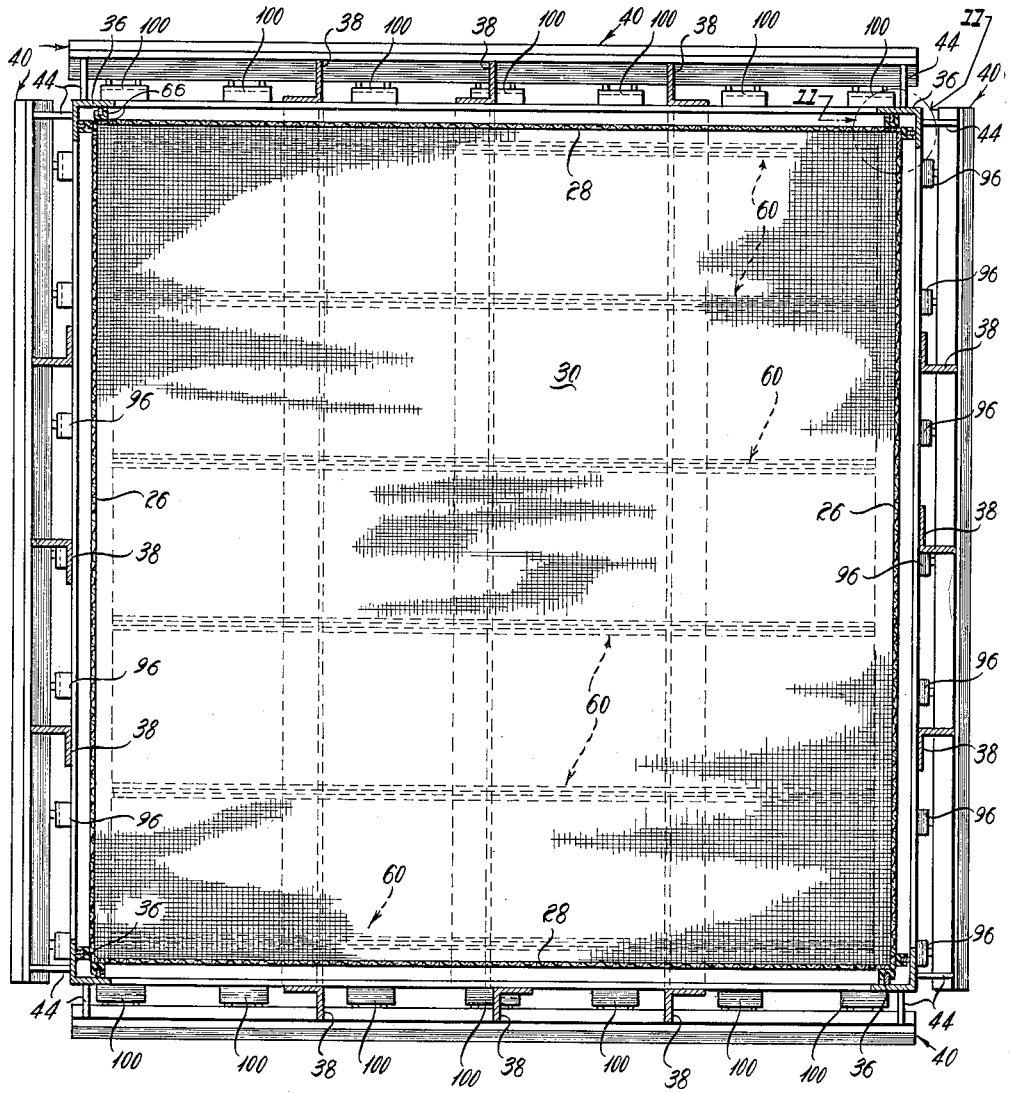
Figure 4 is a horizontal section substantially on the line 4—4 of Figure 1.

Referring now to the drawings and more particularly to Figures 1–4, wherein the construction embodying the principles of the invention are shown, a basket screen structure generally designated at 20 is illustrated to comprise a rectangular framework 22 supporting a basket screen 24. The basket screen 24 is provided with upright side and end walls 26 and 28 mutually perpendicular to a bottom screen wall or deck 30 to form an open box structure. These screen walls 26, 28 and 30 constitute flexible wire mesh screens of suitable gauge and are individually mounted on the frame 22 as will be hereinafter described.

With continued reference to Figuers 1–4, the frame 22 is built up from suitable rigid structural forms to form an open box support for the screen walls 26, 28 and 30 and comprises a horizontally disposed rectangular top frame 32 formed with suitable angle irons and a horizontally disposed rectangular underframe 34 similarly formed with suitable angle irons and underlying the top frame in parallel spaced relation thereto. These frames 32 and 34 are rigidly connected together by upright angle iron corner posts 36 which are secured at their respective ends to the frames 32 and 34 by welding, riveting or other suitable means to form a box screen support structure. To assure a rigid structure, parallel stiffening angles 38 are rigidly secured by welding or other suitable means between the upper frame 32 and the underframe 34 at both the ends and the sides thereof and across the top and bottom frames to form stiffening skirts.

Secured to the lower exposed ends of the vertically standing stiffening angles 38 by welding or other suitable means is a continuous bumper skirt 40 as best shown in Figures 5, 8 and 9 extending around the sides of the frame 22 near the bottom thereof to protect the structure 20 against shock and strain if it is struck against or allowed to collide with other rigid surfaces. Each section of the bumper skirt individual to each upright wall of the basket structure 20 extends horizontally between corner posts 36 and is made up of a horizontal skirt angle 42 welded or otherwise suitably secured intermediate its ends to the lower beveled ends of the upright stiffening angles 38 and near its ends to flat plates 44, which plates 44 are welded to the corner posts 36 so that the leg 46 of the skirt angle iron 42 projects angularly downwardly and outwardly. Secured to the leg 46 by bolt 48 and nut 49 is a rubber bumper strip 50 extending the length of the skirt angle iron and projecting in the same angular direction as the leg 46 beyond the horizontal projection of the screen structure 20. Individual to each fastening bolt 48 is a bolt head bearing washer 52 between the bolt head and the side surface of the bumper strip 50.

In order to suspend the basket structure 20 so that it can be vertically oscillated in an open tank, the frame is flexibly suspended by cables (not shown) connected to a suitable prime mover (not shown), which cables are adapted to be attached to inverted U-shaped rods 54 which are welded or otherwise suitably secured to a horizontal deck plate 56 which is supported above the frame 32 by a pair of head beams 58 rigidly secured to the frame 32 by welding or other suitable means.

With reference to Figures 1–13, the flexible wire mesh screen walls 26, 28 and 30 each are individually mounted on the frame 22 under tension and are individually sealed off about their marginal edges with the frame 22 as will become apparent to prevent the loss of loose resin beads within the basket screen 20 by leakage around the edges of screens between the faces thereof and the frame 22. In accordance with the present invention, this is accomplished by providing for a series of cambering rails 60 individual to each screen wall comprising cambering bars 62 of suitable structural form extending across the face of the walls 26, 28 and 30. The series of cambering bars 62 individual to the bottom deck 30 horizontally extend across the underframe 34 parallel to the end walls 28 and are welded or otherwise secured at their ends to the underframe. The cambering bars individual to the side and end walls 26 and 28 are parallel to each other and extend horizontally between adjacent spaced-apart corner posts 36, being welded or otherwise suitably secured thereto. These cambering bars are of varying depth and project into the interior of the basket screen, having the smaller projections associated with the marginal edges of each screen wall and progressively greater projections approaching the center thereof. Mounted over the bars 62 are resilient U-shaped crowning strips 64, preferably of rubber extrusion, which are fitted over and straddling the bars 62 to provide the requisite uniform camber support surfaces for the screens. Thus in assembled relation, the side and end walls 26 and 28 when drawn across the cambering rails 60 are bowed inwardly between the top and bottom frames 32 and 34 while the bottom deck 30 is crowned inwardly transverse to the end walls 28.

To establish a liquid-tight seal for preventing the loose resin beads within the basket screen from flowing out between the frame and the screen walls which are in supported relation over the camber rails 60, the side and end screen walls 26 and 28 are provided with strip rubber extrusion sealing gaskets 66 between the faces of the screen walls at the marginal side edges thereof and the corner posts 36 of the frame 22, and which extend between the underframe 34 and the top frame 32. These sealing strips 66 are carried on the corner posts 36 by rectangular mounting bars 68 which are welded or otherwise secured to the corner posts and extend between the top and under frames 32 and 34.

The ends of cambering rails 60 are perpendicular to and contiguous with the sealing gaskets 66 which are provided with rectangular slots 79 (Figure 12) to receive the crowning strip mounting bars 62 whereby the bars 62 abut and are rigidly secured to the sides of the sealing gasket mounting bars 68 (Figures 6–8). The ends of the crowning strips 64 thereby abut the sides of the sealing gaskets 66 and the cracks therebetween are filled with neoprene putty or other suitable material. Thus, it will be appreciated from the foregoing that the sealing gaskets 66 and the outermost crowning strips 64, as indicated at 72, cooperate with the sealing gaskets to form a substantially continuous sealing gasket surface facially around the marginal edges of each upright screen wall.

Similarly, the bottom deck 30 also is provided with spaced apart parallel strip rubber extrusion sealing gaskets 74 (Figure 8) adjacent the bottom of the side walls 26 and extending between adjacent corner posts 36. These sealing strips 74 are supported on the underframe 34 by mounting bars 76 (Figure 6) of similar length which are suitably welded to the frame. The ends of the cambering rails 60 individual to the bottom deck 30 are perpendicular to and contiguous with the side sealing gaskets which are provided with rectangular slots 78. The mounting bars 62 of cambering rails 60 extend through these slots 78 to abut and be rigidly secured to the sides of the sealing gasket mounting bars 76 so that the crowning strips 64 of bottom deck 30 and the sealing gaskets 74 form a substantially continuous surface. Where the rubber extrusion strips abut each other, neoprene putty or other similar material is utilized to fill the cracks therebetween. Consequently, it will be appreciated that the sealing gaskets 74 and the outermost crowning strips 64 on the bottom deck 30 establish a continuous sealing gasket surface facially around the marginal edges of the bottom screen wall.

Each of the rubber strip extrusion sealing gaskets 66 and 74 (Figure 12) and the crowning strips 64 are formed from a rubber extrusion of approximately 50 durometer hardness and are U-shaped to fit over and straddle its associated rectangular mounting bar. It is understood that while extruded rubber is preferable, other gasket materials may be employed which possess similar properties of resiliency.

Since the screen walls are cambered in assembled relationship, the face of each screen wall will be sloped at an angle with respect to the cambering and sealing surfaces 82 of the crowning strips 64 which are in abutting compressed relationship with the face of the respective screen walls as will become apparent. Consequently, the compressive force applied to the screens to the respective crowning and sealing gasket strips varies in magnitude over the sealing surface 82, which magnitude of force is greatest at the outer edge of each crowning strip and progressively decreases approaching the center and the inner edge thereof. In order to compensate for the variance of compressive pressure and thereby achieve a positive liquid-tight seal over a substantial portion of the sealing surface 82 as opposed to a single line contact between the screen and crowning strip, a longitudinal slot 88 (Figures 8–10 and 13) is formed in the cross piece 90 of each crowning strip near its sealing surface 82 which presses against the face of its associated screen wall in assembled relationship. This slot 88 when compressed, provides a softer portion of gasket having a softness of rubber which is equivalent to 30 durometer hardness. In this manner, two separate magnitudes of hardness are achieved with a single sealing and crowning strip so that the differences in compressive force effectuated by the cambering of the screen as applied over the sealing surface 82 of the strip gasket is substantially balanced out. Thus, when each rubber gasket is transversely compressed by its associated screen, one edge of the sealing surface 82 establishes solid line contact of 50 durometer hardness while the softer central sealing surface portion between the edges of the sealing and crowning strip which opposes a compressive force of lesser magnitude establishes a further liquid-tight solid line contact along the center of the sealing and crowning strips continuous with the line contact at the edge thereof. Consequently, it will be appreciated that the effective sealing surface of the crowning strips is not limited to the outer edge thereof but rather extends approximately to the center of each strip.

In order to clamp and tension the flexible wire mesh screen walls down on the frame 22, uniformly spaced clamps 92 are provided, having stud bolts 94 which are threadedly secured to the frame 22. Each side wall 26 is provided with a series of these uniformly spaced clamps along the top and bottom thereof. Individual to each of the clamps associated with the side screen walls 26 are socket plates 96 which are welded to the top and underframes 32 and 34. Each socket plate 96 is provided with a centrally located through aperture and an outwardly projecting nut 98 aligned with the through aperture and welded to the plate at the outer end thereof.

The apertures provided in the socket plates 96 associated with the top and bottom of each screen respectively are aligned with suitably formed openings in the frames 32 and 34 and are sloped at an angle of 45° between the frames 32 and 34 and the side walls 26. The stud bolts 94 which project into the interior of the basket screen 20, extend through the openings provided in the frames 32 and 34 and the aperture in their associated socket plates 96. These stud bolts are threadedly secured in the nuts 98 so that the series of bolts along the tops of the side screen walls 26 project at an angle of 45° between the top frame 32 and the wall while the series of stud bolts along the bottom of the wall 26 project at an angle of 45° between the bottom frame 34 and the wall 26.

Similarly, socket plates 96 are provided along each top of the end walls 28 to support a series of stud bolts 94 projecting inwardly and downwardly into the screen basket 20 at an angle of 45°. At the bottom of each end wall 28, the clamps 92 for fastening the screen walls 28 are alternately spaced between the clamps fastening the bottom deck 30. In order to support the stud bolts 94 of these clamps on the frame 34, socket plates 100 are welded thereto and are each provided with two spaced apart through apertures and nuts 102 aligned therewith, which are welded to the outer edges of the plates. Thus, each plate 100 carries one stud bolt associated with the bottom deck 30 and one stud bolt associated with the end wall 28, which bolts are threadedly mounted in the nuts 102 and project into the interior of the basket screen at an angle of 45° with the frame 34 and the walls 28.

In order to firmly grip the edges of the wire mesh screen walls, each clamp 92 is provided with a hook 104 (Figures 8–10) which is welded near the inwardly projecting end of the stud bolt 94 along an axis eccentric to that of the bolt. The marginal edges of the screen walls which are secured by the clamps 92 are bent around the hooks 104, as indicated at 106, to extend between the legs thereof. A screen clamp spacer plate 108 is provided between one leg of the hook 104 and the bent-over portion of the screen wall so as to wedge the marginal edge of the screen wall firmly in the hook.

To prevent the clamped screen walls from becoming disengaged with the hooks 104 when tension is applied thereto, screen hook strips 110 are bent around the hook 104 and a sleeve 111 which fits over the marginal edges of the screen walls to prevent the hooks 104 from tearing or pulling at the wire mesh. To resist slippage of the hook strips 110, strip bumpers 112 are suitably secured to the corner posts 36 underlying the hook strips 110 and adjacent thereto so that the hook strips are depressed into the bumpers in assembled relationship.

Consequently, it will be appreciated from the foregoing that each screen wall is flexed over its associated series of cambering rails 60 and is fastened in hooks 104 of the clamps 92 so that the rubber strips 64, 66 and 74 forming the sealing gasket surfaces are compressed. The stud bolts 94 are then uniformly shifted outwardly by threading them further into their respective nuts 98 and 102 so as to apply a uniform horizontal pull on their associated screen walls transversely across the cambered faces thereof. This action uniformly tensions and tightly draws the screens across the cambered rails 60 to establish a uniformly distributed tensile force in the screens. The eccentric thrust on the hooks 104 when tensioning the screen is carried as a bending stress on the stud bolts 94 due to the slope of the stud bolts and their limitation to longitudinal movement relative the frame 22.

Since the screens are cambered the uniformly distributed tensile force will have a vectorial direction which is the same as the slope of the cambered face of each screen. This angular screen tensile force has a vertical force component which, when the horizontal pull is applied, causes the screen to press firmly into the sealing strips 64, 66 and 74 and to intermesh therewith to form a liquid-tight seal between the marginal edges of the screen and the enclosing parts of the frame. In this manner the uranium carrying resin beads which are loose in the basket and are of such size to preclude passage through the wire mesh of the screens, are substantially confined to the interior of the basket and cannot leak out between adjacent edges of adjoining screens and the frame.

At the same time the sealing of the screens is effected, the uniform tensioning of the screens functions to eliminate any uneven slacks or tensions so that there is substantially no reverse bending of the screens during operation when the basket screen is subjected to varying magnitude of bead pressure and other forces established by carrying the weight of the resin beads. Consequently, the basket screen in accordance with the present invention has a relatively long operational life and the recovery of uranium carrying resin beads is efficiently facilitated.

In order to prevent corrosion of the basket screen 20 when it is exposed to materials and fluids which attack the rubber and metal materials of the basket at points of metal-to-metal and rubber-to-metal contact, these areas are coated preferably with a protective coating commonly known as Carbomastic No. 3 which is made up of epoxy tar, red lead and customary binders. Other similar coating materials such as rubber base paint may be alternately used. As a further alternative for coating these parts, rubber may be directly vulcanized onto the critical areas to achieve the desired protection.

In applying the protective coating to the critical areas, the wire mesh screen first is prepared by thoroughly cleaning it and pickling it in a 10% solution of nitric acid for approximately two minutes. After the screens are cleaned and pickled they are washed down to remove any acid thereon and then dried.

An initial coating is then applied to the screen along the areas which make contact with the extruded rubber gaskets and cambered coverings. The screen is then turned over and a similar coating is applied over the area backed and outlined by the application on the opposite side thereof. This coat is dried at room temperature or by forced hot air passing over the surfaces thereof. When the first coat has dried, a second coat is applied to the screen exactly as the first was applied.

The screen is then allowed to stand for final curing at a temperature of approximately 120°. After the final curing of the second coat, the screen is flexed over the coated area to the extent that such flexing may occur during normal use, to assure that no cracks or breaks in the coating appear. Thereafter the screens are assembled in the basket.

Thus, in the particular operational example wherein the principles of the invention are shown, the protective screen coating substantially eliminates corrosion of the basket screen by the various acidic solutions into which the basket screen is dipped and hence further increasing the operational life thereof to achieve an efficient overall functioning of the uranium recovery process.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a basket structure adapted to be immersed in fluids, a basket screen having flexible wire mesh screen walls set up in angular relation to each other, means for supporting said screen walls including a rigid frame and means for cambering said screen walls in supporting relation over said frame, resilient means between said frame and the marginal edges of each of said screens for sealing said marginal edges of said screen facially with said frame, and means for applying a uniform horizontal pull on each of said screens from opposed sides thereof transversely across the cambered face thereof to uniformly tension said cambered screen and to establish a vertical compressive force component for pressing said screens firmly against said resilient means to provide a liquid-tight seal between said frame and the marginal edges of said screens continuous around the edges thereof, said frame being provoided with closed wall portions between the adjacent seals individual to each of said screen walls whereby transfer of fluid within said basket screen is confined to passage through said screen walls.

2. In the structure defined in claim 1 wherein said wire mesh screen walls, said cambering means and said sealing means are coated with a film of material to minimize effects of corrosion thereon.

3. In the structure defined in claim 1 wherein said angularly disposed screen walls comprise upstanding walls forming a rectangle and a bottom deck, said upstanding walls being mutually perpendicular to said bottom deck.

4. In the structure defined in claim 3, wherein said cambering means comprises a series of parallel spaced-apart resilient rubber sealing bars mounted on said frame and perpendicularly extending between opposed ones of said upstanding screen walls.

5. In the structure defined in claim 4 wherein said resilient means individual to each of said screen walls comprises opposed resilient extruded rubber strip gaskets mounted on said frame in contiguous perpendicular relation to said cambering bars, the outermost cambering bars cooperating with said sealing gaskets to establish the liquid-tight seal continuous around the facial marginal edges of each of said screen walls.

6. In the structure defined in claim 5 wherein at least each of said cambering bars are provided with a longitudinal slot underlying and parallel to the sealing surfaces engaging and intermeshing with associated ones of said screen walls, said slot terminating intermediate the lateral sides of said bars whereby to provide a sealing surface having a softer longitudinal central portion relative to the facial marginal edges thereof.

7. In the structure defined in claim 3 wherein said means for applying a horizontal pull on said screen comprises a plurality of uniformly spaced-apart screen clamps carried by said frame and individual to opposed sides of each of said screen walls, each of said clamps including a stud bolt threadedly mounted on said frame and a hook member eccentrically rigidly secured to said stud bolt, the marginal edges of said screen walls being detachably fastened in associated ones of said hook members in assembled relation, said stud bolts being in angular sloping relation to associated ones of said screen walls and limited to axial movement relative said frame whereby the eccentric thrust of said clamp in tensioning said screen walls is carried as a bending stress on said stud bolt.

8. In the structure defined in claim 7 wherein the angle of slope between said stud bolts and the associated ones of said screen walls is substantially 45°.

9. In the structure defined in claim 7 wherein said hook members are provided with screen hook strips clamping said screen walls in said hook members and wherein resilient bumpers are mounted on said frame between said frame and said screen hook strips, said screen hook strips compressing said bumpers in assembled relation whereby to prevent said screen hook strips from slipping out of fastening engagement with said clamps.

10. In a screen structure for recovering resins from a pulp, a basket screen carried by said frame and having at least one flexible wire mesh screen, means for supporting said screen including a rigid frame having enclosed portions and resilient means providing a crown in said screen wall and sealing opposed marginal edges of said screen facially with said enclosed portions of said frame, sealing means carried by said frame for facially sealing said screen substantially fluid-tight about its marginal edges between said resilient means with said frame whereby material transfer within said basket screen is confined to passage through said crowned screen, and means carried by said frame for applying a uniform horizontal tension transversely across the crown face of said screen whereby to uniformly draw said screen tightly over said crowning means and to establish a vertical compressive force component perpendicular to said screen for pressing said screen firmly into said sealing and resilient means to intermesh therewith thereby establishing a positive fluid-tight seal between the edges of said screen wall and said frame.

11. A screen structure adapted for intermittent cyclic immersion into a fluid comprising a frame having enclosed portions, a basket screen supported by said frame and having flexible cambered wire mesh screen walls set up in angular relation to each other, means for sealing said screen walls facially around the marginal edges thereof substantially fluid-tight with said enclosed portions of said frame including resilient strips individual to each of said screen walls and compressed between said frame and the marginal edges of said screen walls, and means for adjustably applying a horizontal tension transversely across the face of said cambered screen walls whereby to draw said walls tightly over said frame and at the same time to press said screen walls firmly against said resilient sealing strips to establish a liquid-tight seal therebetween.

12. In the structure defined in claim 11 wherein said tensioning means comprises a plurality of spaced-apart screen clamps carried by said frame at opposed sides of each of said screen walls, each of said clamps including a stud bolt threadedly mounted on said frame in supporting relation to associated ones of said screen walls and a hook member eccentrically and rigidly secured to said stud bolt, the opposed marginal edges of said screen walls being detachably fastened in said hook members in assembled relation whereby the eccentric thrust of said clamps in tensioning said screen wall is carried as a bending stress on said stud.

13. The structure defined in claim 12 wherein said hook members are provided with screen hook strips clamping said screen walls in said hook members and wherein resilient bumpers are mounted on said frame between said frame and said screen hook strips, said screen hook strips compressing said bumpers in assembled relation whereby to prevent said screen hook strips and said screen from slipping out of fastening engagement with said clamps.

14. A screen structure for screening fluids comprising a frame, a basket screen supported by said frame and having screen walls set up in angular relation to each other, resilient sealing means individual to each of said screen walls carried by said frame to facially abut each of said screens continuously around the marginal edges thereof, means for cambering each of said screens whereby to press the marginal edges of each of said screen walls firmly against said resilient sealing means to compress said sealing means for establishing a seal therebetween, and means for tensioning each of said screen walls across the cambered face thereof whereby to draw said cambered screens tightly over said frame and to increase the sealing pressure between each of said screen walls and said sealing means by compressively pressing said screen walls vertically against said sealing means to thereby establish a continuous liquid-tight seal about the marginal edges of said screen walls.

15. The structure defined in claim 14 wherein said frame is provided with closed wall portions between said liquid-tight seals individual to each of said screens whereby transfer of fluid from within said basket screen is confined to passage through said screen walls.

16. The structure defined in claim 15 wherein each of said screen walls is supported in perpendicular relation to its associated screen wall adjacent thereto.

17. In the structure defined in claim 15 wherein said cambering means comprises resilient bars mounted on said frame and extending the length of associated ones of said screen walls substantially parallel to the sides thereof.

References Cited in the file of this patent
UNITED STATES PATENTS 2,511,239      Behnke et al. _____ June 13, 1950